UNITED STATES PATENT OFFICE.

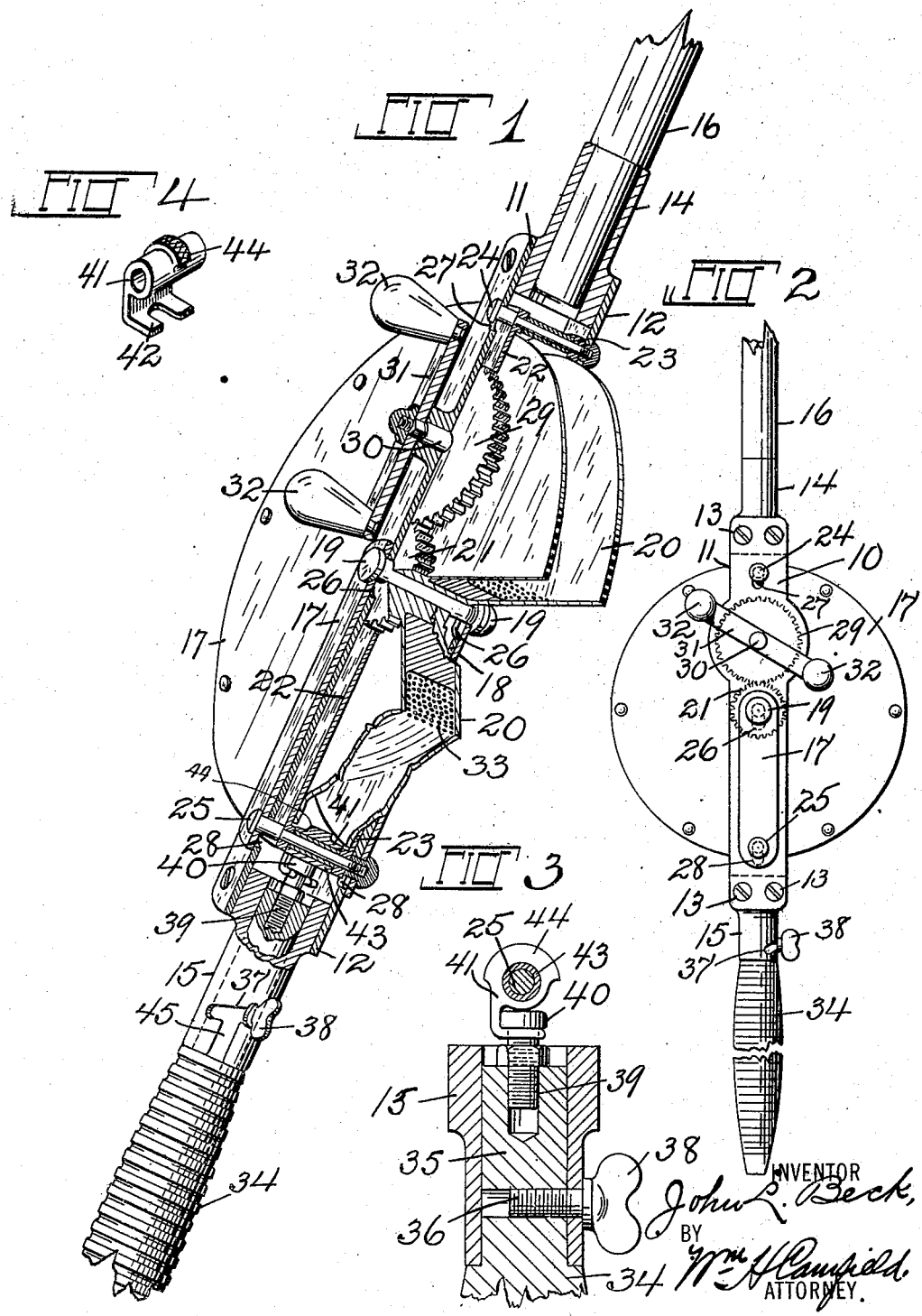

JOHN L. BECK, OF NEWARK, NEW JERSEY.

FISHING ROD AND REEL.

1,327,751.        Specification of Letters Patent.        Patented Jan. 13, 1920.

Application filed June 10, 1919.   Serial No. 303,204.

*To all whom it may concern:*

Be it known that I, JOHN L. BECK, a citizen of the United States, and a resident of Newark, county of Essex, and State of New Jersey, have invented certain new and useful Improvements in Fishing Rods and Reels, of which the following is a specification.

This invention relates to an improved fishing rod and reel, the reel being actuated by a manually operated means such as a handle, or made free to spin, such conditions of operation being regulated by the position of the handle of the fishing rod relative to the reel.

The invention is also designed to provide a device of this kind in which the handle can be attached or detached to or from the bracket in which the reel is mounted to permit a compact folding of the parts when desired.

The fishing reel which is the result of this invention is adapted for different kinds of fishing, but I illustrate and describe a form adapted for surf fishing or fishing where large fish are expected, in this arrangement the reel being above the handle and having a handle with a limited rotation so that when the handle is twisted slightly in one direction the reel is free to spin, but when rotated in the other direction the reel is in contact with the winding means and is operable from a suitable handle.

The invention consists also of various details and combinations of parts more fully described hereinafter and finally embodied in the claims.

In the drawing, in which one type of my improved fishing reel is illustrated, Figure 1 is a perspective view, partly broken away, of my improved reel and rod. Fig. 2 is a side view thereof. Fig. 3 is a detail section showing one form of attachment that connects the handle and the reel support, and Fig. 4 is a perspective view of a finger piece and hook that are part of the connection shown in Fig. 3.

In the form of device illustrated, the bracket 10 consists of side pieces 11 and 12, which are connected by any suitable means, such as screws 13, to an upper socket 14 and a lower socket 15, the upper socket being adapted to receive the bottom end 16 of the fishing rod. The reel support consists of the bars 17 and 18, the upper ends of which are connected by the axle 19, on which the reel 20 freely rotates, the reel 20 being suitably connected to a gear 21 which rotates with the reel, but is preferably separated therefrom by a partition 22, and a partition 23 on the opposite side of the reel extends above the reel and is connected by a bolt or pin 24, this structure tending to strengthen the device, this stability being desired in the larger kinds of reel used for surf and similar fishing. The lower ends of the bars 17 and 18 are connected by a bolt 25. The axle 19, the bolt 24 and the bolt 25 operate in the slots 26, 27 and 28, respectively, so that the bars, the axle of the reel, the reel and the gear 21 can be slid longitudinally on the bracket.

It will thus be seen that when the reel is slid upward, it is placed in mesh with the gear wheel 29, which is fixed on the shaft 30 on one of the side pieces, such as the side piece 11, and is provided with the arm 31 and the crank handles 32. When the reel support is pushed upward, this meshing of the gears permits the operation of the reel from the handles 32, and when the reel support is slid down, it separates the gears and the reel is free to spin to permit the uninterrupted unreeling of the line 33.

I may provide means for regulating the relative positions of the operating means of the reel and of the reel itself without moving the hand grasping the handle of the wheel from said handle, and in the form shown the handle 34 has a shank 35 extending through the lower socket 15 and provided with a stud 36 in an inclined slot 37, which stud can be formed, if desired, with a finger piece 38, and, being threaded, can serve to lock the handle in position, but ordinarily with the screw loosened the handle has a limited rotative movement, and when so rotated it is pushed forward or backward by reason of the inclination of the slot 37 acting on the stud 36 to cause longitudinal movement of the shank 35 in the socket.

The shank 35 is provided with a stud 39 with a head 40 thereon, and the clip 41 has a forked end 42 which can be swung under the head 40, the clip being rotatably mounted on the bolt 25, and to provide for its free rotation I prefer to mount it on a sleeve 43 on said bolt 25. A finger piece, such as the knurled projection 44, permits a manual swinging of the clip 41. It will thus be evident that when the hand that is on the handle 34 is twisted to the left, in the type of device shown, the shank 35 is pulled downward on the clip 41, and this causes the reel support to be pulled down and the gears 21 and 29 are not in mesh and the reel is free to spin and rotate without hindrance. When the handle is turned in the other direction, that is, to the right, the shank 35 is forced upward and the reel support is likewise forced upward and the gears 21 and 29 are in mesh and the handles 32 can be used, so that the operating means for the reel can function and it can be wound or unwound and its direction of speed regulated.

The direct operation by means of the handle is advantageous, since between the moment the hand leaves the handle of the fishing rod and grasps the handle of the reel, there is no time lost in feeling for small protuberances or shift buttons and a free spinning wheel can be at once brought into control, and on the other hand the manually operable position of the wheel can be instantly changed to permit it to spin if casting or other circumstances make it desirable to permit such free rotation of the reel.

It will be understood that changes can be made in this construction to bring about the same result, and that other means for causing connection and disconnection of the reel to and from its operating means through a movement of the handle can be used, and that I do not wish to be understood as limiting myself to the exact form as illustrated and described in this specification.

When the device is to be taken apart, the finger is inserted underneath the reel and the knurled part 44 is rotated enough to permit the hooked end 42 to free the stud 39, and by then turning the handle until the stud 36 is opposite the entrance slot 45 of the slot 37, the handle 34 can be withdrawn from the bracket 10.

The assembling of the handle 34 and the bracket 10 is simply a reversal of the steps enumerated for the separation of these elements, and will be readily understood.

I claim:

1. A fishing rod having a reel thereon, a handle for the rod, a manually operated means independent of the handle for positively operating the reel, means for connecting and disconnecting said operating means, the handle having a limited movement for controlling said connecting and disconnecting means.

2. A fishing rod having a reel thereon, a means including a crank handle for operating the reel, said means and the reel being movable relative to each other so as to be connected or disconnected, and a handle for the reel, said handle also being used for regulating said connection.

3. A fishing rod, a reel movable thereon, an operating means for the reel and adapted to be operative or inoperative according to the position of the reel relative thereto, and a handle with a limited rotation and connected to said operating means so as to control it by the rotative movement of the handle.

4. A fishing rod, a reel thereon, a handle for the rod, a manually operated means for rotating the reel in either direction, said handle being operable so as to be moved to throw the reel and the said operating means into and out of operative relation.

5. A fishing rod having a fixed reel control thereon, a movable reel, and a handle with a limited movement and connected to the reel so as to move it into and out of engagement with the reel control as the handle is moved.

6. A fishing rod comprising a bracket with a gear mounted to rotate in a fixed bearing thereon, a reel, a sliding fixture on the bracket, said fixture carrying said reel, a gear connected to the reel and mounted in a bearing carried on said fixture, a handle for operating the gear in the fixed bearing, and means for moving the fixture to throw the gears into and out of mesh.

7. A fishing rod comprising a bracket having means on its top end for receiving a section of the fishing rod, and having means on its bottom end for receiving a handle and providing for limited movement of said handle, a handle secured to said bracket, a reel within the bracket, a reel controlling and operating means secured to the bracket, and a connection between the handle and the reel, whereby movement of the handle regulates the position of the reel relative to its controlling means.

8. A fishing rod comprising a bracket having means on the upper end for receiving a section of the fishing rod, a handle on the lower end of said bracket, a reel support slidably arranged on the bracket, a gear on the reel support, a reel on the reel support, a gear rotating in a fixed bearing on the bracket, means for operating said last mentioned gear, and means connecting the handle and the reel support, whereby the reel support can be moved to put the gears in or out of mesh.

9. A fishing rod comprising a bracket, a handle on the end of the bracket and mounted therein so as to have a limited rotation and a limited longitudinal movement, a reel support slidably arranged on the bracket, means for connecting the reel support and the handle so that when the handle is turned the reel support is slid on the bracket, and a reel controlling and operating means secured to the bracket and disposed so that the reel is in contact therewith when the handle is in a predetermined position.

10. A fishing rod comprising a bracket having a socket on its lower end, a handle with a shank in said socket, the shank being headed, a reel support slidably arranged on the bracket, a reel on the reel support, a connection for detachably securing the headed shank of the handle with the reel support, a stud on the shank, the socket having an inclined slot into which said stud projects, a gear on the reel support and adapted to rotate with the reel, a gear rotated in a fixed bearing on the bracket and with which the gear on the reel is adapted to be placed in mesh, and means for operating the gear in the fixed bearing.

In testimony that I claim the foregoing, I have hereto set my hand, this 7th day of June, 1919.

JOHN L. BECK.